United States Patent [19]

Jewers

[11] Patent Number: 4,745,688

[45] Date of Patent: May 24, 1988

[54] TRUEING DEVICE

[76] Inventor: David Jewers, 12 Woolmer Drive, Willesborough, Ashford, Kent, TN24 OUD, England

[21] Appl. No.: 40,808

[22] Filed: Apr. 21, 1987

[30] Foreign Application Priority Data

May 8, 1986 [GB] United Kingdom ................. 8611268

[51] Int. Cl.⁴ ................................................ G01C 9/28

[52] U.S. Cl. ...................................................... 33/372

[58] Field of Search ................. 33/370, 371, 372, 373, 33/613, 623

[56] References Cited

U.S. PATENT DOCUMENTS

| | | | |
|---|---|---|---|
| 376,341 | 1/1888 | Panyard | 33/372 |
| 1,241,341 | 9/1917 | Chambers | 33/372 |
| 2,168,505 | 8/1939 | Zenewich | 33/372 |
| 2,624,118 | 1/1953 | Anderson | 33/372 |
| 4,066,232 | 1/1978 | Hermeyer | 33/372 |

*Primary Examiner*—Richard R. Stearns
*Attorney, Agent, or Firm*—Roylance, Abrams, Berdo & Goodman

[57] ABSTRACT

A trueing device for use in the hanging of wallpaper, which trueing device comprises first and second jaws which are biased to a closed position for gripping a longitudinal edge of the wallpaper, first and second hand grips respectively positioned one on each of the first and the second jaws, a spirit level for enabling the trueing device to give a true vertical line, and abuting means against which the longitudinal edge of the wallpaper abuts in order that the trueing device is correctly positioned along the longitudinal edge of the wallpaper. The trueing device is such that it is operable with one hand for ease of insertion and removal of the trueing device on the wallpaper during hanging of the wallpaper.

11 Claims, 4 Drawing Sheets

TRUEING DEVICE

This invention relates to a trueing device and, more especially, this invention relates to a trueing device for use in the hanging of wallpaper.

During the hanging of wallpaper, it is essential to get the first sheet that is to be hung on a wall in a true vertical position. If the first sheet of the wallpaper is not in a true vertical position, considerable difficulty can be obtained in hanging the second and subsequent sheets of wallpaper and it may be necessary to overlap the wallpaper sheets, which tends to be unsightly. It is possible to use a plumb line in order to ensure that the various sheets of wallpaper are truly vertically mounted but a plumb line is not easy to handle whilst trying to hang wallpaper at the same time.

It is an aim of the present invention to provide a trueing device which enables sheets of wallpaper to be hung vertically and which is operable with one hand.

Accordingly, this invention provides a trueing device for use in the hanging of wallpaper, which trueing device comprises first and second jaws which are biased to a closed position for gripping a longitudinal edge of the wallpaper, first and second hand grips respectively positioned one on each of the first and the second jaws, a single spirit level for enabling the trueing device to give a true vertical line, and abuting means against which the longitudinal edge of the wallpaper abuts in order to ensure that the trueing device is correctly positioned along the longitudinal edge of the wallpaper, the trueing device being such that it is operable with one hand for ease of insertion and removal of the trueing device on the wallpaper during hanging of the wallpaper, and the spirit level vial being a straight spirit level vial which enables the spirit level vial to be read when the trueing device is gripping either longitudinal edge of the wallpaper.

The truing device of the invention will normally be applied to a free side of the wallpaper. The wallpaper can be pasted on a table and then the trueing device attached to a longitudinal edge of the wallpaper whilst the wallpaper is still on the table. With the trueing device correctly positioned, the sheet of wallpaper can then be hung on a wall and the spirit level can be used to determine when the sheet of wallpaper is in the correct vertical position. The trueing device can then be removed and, advantageously, it can be positioned once or twice more at different other positions along the sheet of wallpaper just to check that the sheet of wallpaper is hanging truly vertically. Once it has been established that the sheet of wallpaper is hanging truly vertically, then the trueing device can be removed and the sheet of wallpaper can then be firmly and finally adhered to the wall. Because the trueing device is operable with one hand, it will be appreciated that the sheet of wallpaper can easily initially be temporarily stuck to the wall and held in position with one hand, whilst operating the trueing device with the other hand.

Preferably, the trueing device is formed in two separate parts with the first jaw belonging to one part and the second jaw belonging to the other part.

The first and the second jaws may be biased to the closed position by spring means.

The spring means preferably comprises a pair of clips which fit over a rear edge of the first and the second jaws. The clips may be C-shaped clips. Other shaped clips may be employed if desired.

As an alternative to employing separate spring means, the trueing device could be formed so that the first and second jaws are biased to the closed position by the natural resilience of material from which they are formed.

Advantageously, the trueing device is one in which the first hand grip is formed as an integral extension of the first jaw, and in which the second hand grip is formed as an integral extension of the second jaw.

Usually, the spirit level will be provided on the first jaw. The first jaw will usually be that jaw which is farthest away from the wall to which the wallpaper is to be hung so that the spirit level will easily be seen.

The spirit level may advantageously be provided in a housing provided on the first jaw.

A cap may be provided for fitting to the housing to enclose the spirit level once the spirit level is in position in the housing. The cap may clip into position.

Preferably, the straight spirit level vial is in the form of a straight cylinder.

The housing can be precisely positioned on the first jaw and the housing can also be precisely formed with a recess for receiving the spirit level. Thus the spirit level can easily be assembled in a correct position with respect to the remainder of the trueing device.

The abuting means may be at least one elongate wall portion. A single long wall portion may be employed or, for example, two smaller spaced apart wall portions may be employed.

The abuting means may advantageously form a fulcrum about which the first and the second jaws pivot.

The abuting means may be integrally formed on an inner facing surface of the second jaw.

The trueing device may include gripper means for gripping the wallpaper. The gripper means is advantageously employed to stop any tendency of the trueing device to slide on the wallpaper, especially when the wallpaper has been heavily pasted with wallpaper paste. The gripping means may comprise at least one gripper tooth. Preferably, there are two spaced apart elongate gripper teeth.

The trueing device preferably includes visual checking means for enabling a user of the trueing device visually to check that the longitudinal edge of the wallpaper is correctly abutting the abuting means.

The visual checking means may comprise a pair of spaced apart apertures which are in both the first and the second jaws and which enable the longitudinal edge of the wallpaper adjacent the abuting means to be seen.

The trueing device is advantageously moulded from a plastics material. Any desired and suitable plastics material may be employed such for example as polyethylene. When the trueing device is molded from plastics materials, it will be appreciated that it can easily be wiped clean and there will be no tendency for the trueing device to corrode, as might be the case if the trueing device is made from a metal. It is to be appreciated however that the trueing device can be made of any desired and suitable materials.

Advantageously, the trueing device is so constructed that in use the centre of gravity of the trueing device does not extend beyond the longitudinal edge of the wallpaper. This stops any tendency of the trueing device to flap around on the edge of the wallpaper.

Advantageously, the first and the second jaws are so shaped as to facilitate the fixing of the trueing device on the wallpaper. Thus, for example, the first and the second jaws may have cut away edges forming lead-in portions for receiving the longitudinal edge of the wallpaper.

The trueing device is preferably constructed such that it can be used equally easily by right handed and left handed persons, and on either longitudinal edge of the wallpaper.

An embodiment of the invention will now be described solely by way of example and with reference to the accompanying drawings in which.

Figure 1:
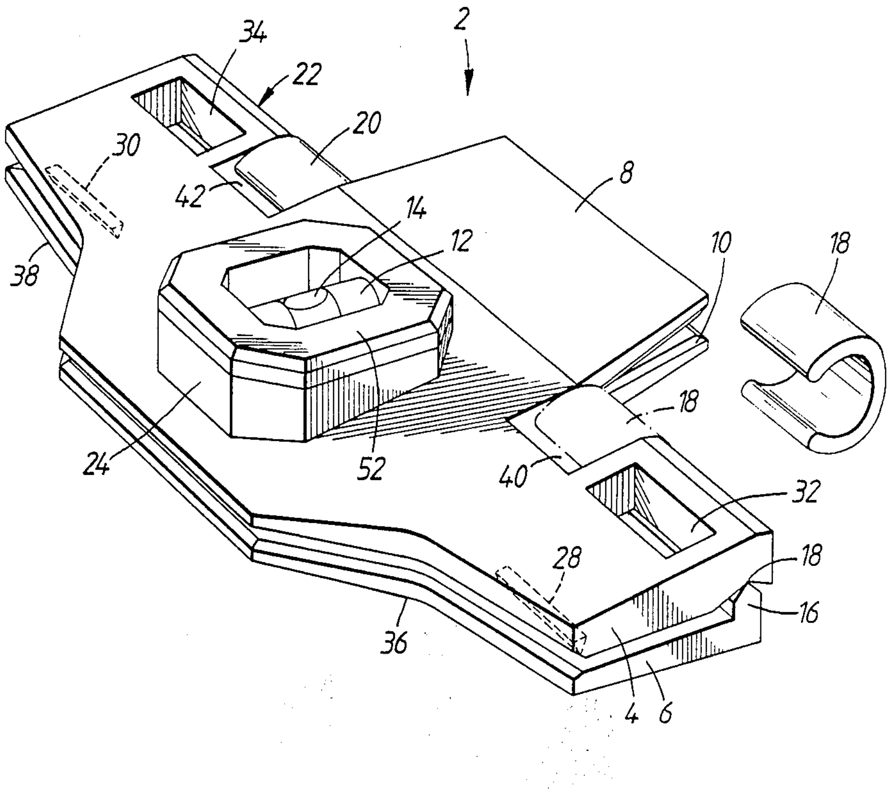
FIG. 1 is a perspective view of a trueing device.
Figure 2:
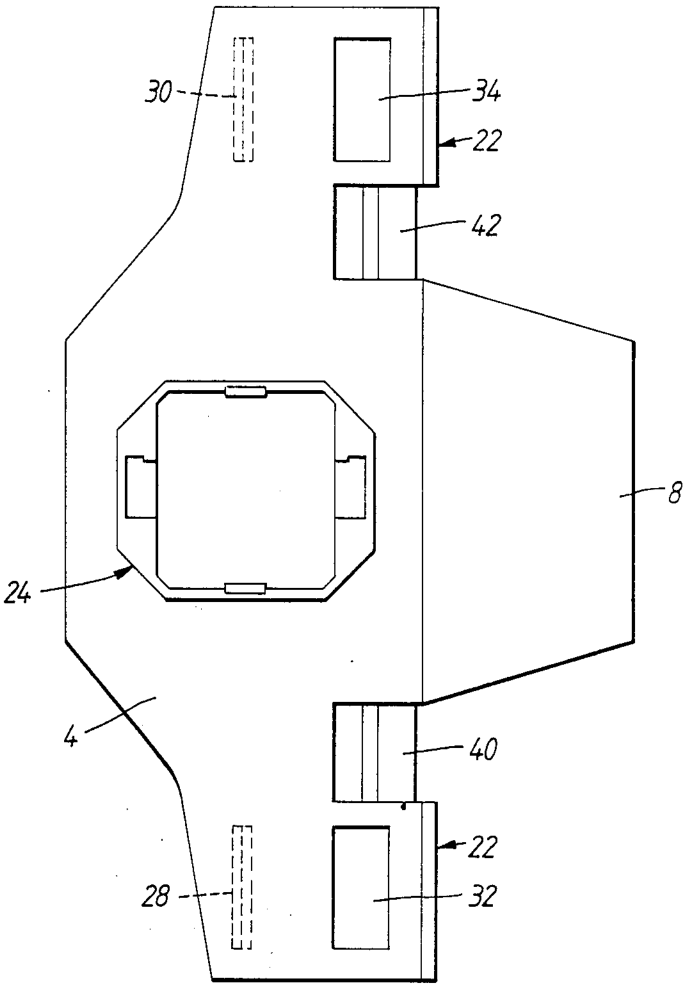
FIGS. 2 and 3 are respectively top plan and end views of a first part of the trueing device.
Figure 3:
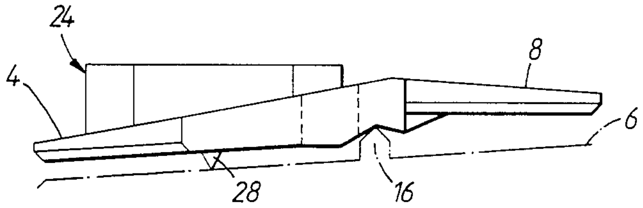

Referring to the drawings, there is shown a trueing device 2 for use in the hanging of wallpaper (not shown). The trueing device 2 comprises a first jaw 4 and a second jaw 6. The first and the second jaws 4,6 are biased to a closed position as shown in FIG. 1 for gripping a longitudinal edge of the wallpaper.

The trueing device 2 also comprises a first hand grip 8 and a second hand grip 10. The first hand grip 8 is formed as an integral extension of the first jaw 4, and the second hand grip 10 is formed as an integral extension of the second jaw 6.

A spirit level in the form of a straight cylindrical spirit level vial 12 is provided for enabling the trueing device 2 to give a true vertical line. The trueing device 2 will be indicating a true vertical line when a bubble 14 is centrally positioned along the spirit level vial 12.

The trueing device 2 also includes abuting means in the form of a single longitudinally extending wall 16. The longitudinal edge of the wallpaper abuts against the wall 16 in order to ensure that the trueing device 2 is correctly positioned along the longitudinal edge of the wallpaper. The trueing device 2 is such that it is operable with one hand for ease of insertion and removal of the trueing device on the wallpaper during hanging of the wallpaper.

The first jaw 4 and the first hand grip 8 form one part of the trueing device 2 and the second jaw 6 and the second hand grip 10 form another part of the trueing device 2. The first and the second jaws 4,6 are biased to the closed position by spring means in the form of a pair of C-shaped clips 18,20 which fit over a rear edge 22 of the first and the second jaws 4,6.

The spirit level vial 12 fits in a recess formed in a housing 24. The housing 24 is formed as an integral part of the first jaw 4. The housing 24 will be accurately moulded as part of the first jaw 4. The spirit level vial 12 will fit into an accurately moulded recess in the housing 24. Thus, the spirit level vial 12 can easily be assembled in the certain knowledge that it is correctly positioned on the trueing device 2 for giving a correct reading.

The wall 16 is integrally formed on an inner facing surface of the second jaw 6. The wall 16 has a pointed edge 18 which enables the wall 16 to act as a fulcrum about which the first and the second jaws 4,6 pivot.

The trueing device 2 includes gripper means in the form of a pair of spaced apart elongate gripper teeth 28,30. The gripper teeth 28,30 are for gripping the wallpaper and thus stopping the trueing device 2 from sliding on the wallpaper, for example when the wallpaper has been heavily pasted.

Figure 4:
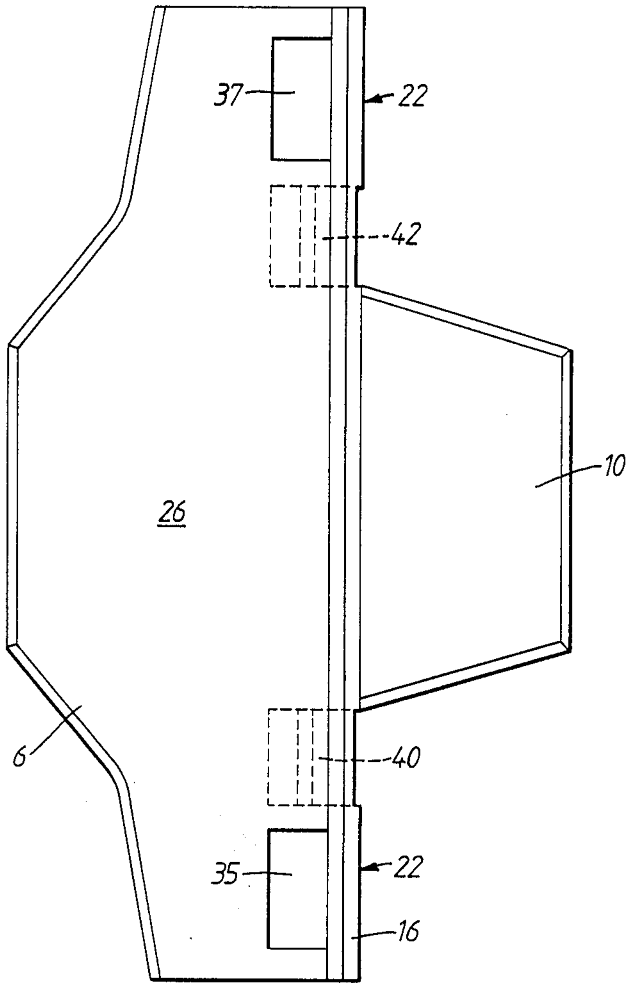
FIGS. 4 and 5 are respectively top plan and end views of a second part of the trueing device.
Figure 5:
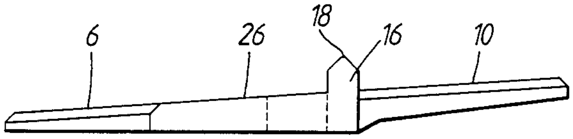

The trueing device 2 includes visual checking means in the form of a pair of spaced apart apertures 32,34 which are formed in the first jaw 4 and which enable the longitudinal edge of the wallpaper adjacent the wall 16 to be seen from the first jaw 4 side of the trueing device 2. As shown in FIG. 4, the jaw 6 is also formed with visual checking means in the form of a pair of spaced apart apertures 35,37. The apertures 35,37 enable the longitudinal edge of the wallpaper to be seen from the second jaw 6 side of the trueing device 2. Thus, when the longitudinal edge of the wallpaper is abuting the wall 16 along its length, as can be determined by looking through the apertures 32,34 or the apertures 35,37, then the trueing device 2 is correctly positioned on the longitudinal edge of the wallpaper for giving a correct reading.

Figure 6:
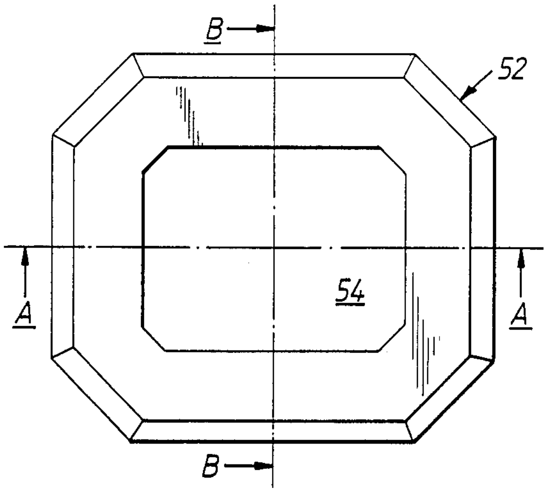
FIG. 6 is a detail of a cover part of the trueing device.
Figure 7:
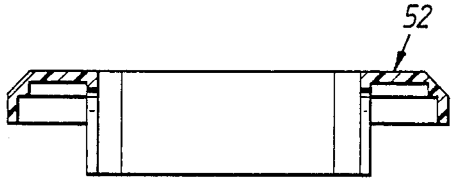
FIG. 7 is a section on the line A—A shown in FIG. 6.
Figure 8:
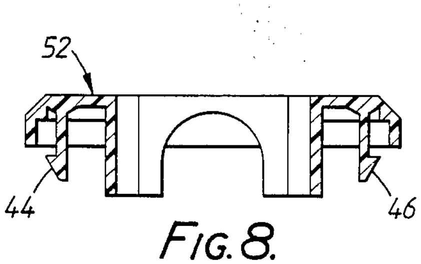
FIG. 8 is a section on the line B—B shown in FIG. 6.

The housing 24 is provided with a cover 52 for fitting to the housing 24 to enclose the spirit level vial 12 once the spirit level vial 12 is positioned in the housing 24. The cover 52 has a central portion 54 through which the bubble 14 can be seen. As shown in FIGS. 6,7 and 8, the cover 52 is separately formed from the housing 24, and the separately formed cover 52 is fixed in position by means of clips 44,46.

The trueing device 2 is so constructed that its centre of gravity does not extend beyond the longitudinal edge of the wallpaper. This stops the trueing device 2 from flapping on the edge of the wallpaper as might be the case if the centre of gravity of the trueing device 2 extends too far beyond the longitudinal edge of the wallpaper. The first and second jaws 4,6 are cut away as shown to form lead-in portions 36,38 to facilitate clipping the trueing device 2 to the longitudinal edge of the wallpaper.

The trueing device 2 is advantageously moulded from a plastics material which can easily be kept clean.

When hanging the wallpaper, the trueing device 2 is clamped to a longitudinal edge of the wallpaper so that the jaw 4 and hence the spirit level vial 12 are against the front unpasted side of the wallpaper, while the second jaw 6 is on the pasted side of the wallpaper between the wallpaper and the wall which is to receive the wallpaper. It will be convenient if the trueing device 2 is set in place whilst the pasted wallpaper is still on a pasting table (not shown) with the pasted side of the wallpaper facing upwards, so that the trueing device 2 is ready for immediate use, with no fitting required, when the wallpaper is taken to the place where it is to be hung. When fitting the trueing device 2 at the pasting table as described above, the first jaw 4 will be positioned between the unpasted side of the wallpaper and the pasting table. In this case, the rear of the second jaw 6 will be visible and the apertures 35,37 assist with visual checking of the position of the trueing device 2 with respect to the longitudinal edge of the wallpaper.

It is to be appreciated that the embodiment of the invention described above with reference to the accompanying drawings has been given by way of example only and that modifications may be effected. Thus, for example, the shape of the housing 24 and the shape of the first and the second hand grips 8,10 can be varied as may be desired. Although the C-shaped clips 18,20 are shown as being located in recessed portions 40,42 on the first and the second jaws 4,6, other types of locating arrangements may be employed. Further, the shape of the jaws 4,6 can be varied as may be desired. Devices other than the clips 44,46 can be employed for fixing the cover 52 to the housing 24. If desired, the spirit level vial 12 can be positioned in the housing 24 from underneath the housing 24 instead of from the top of the housing 24 as shown in the drawings and, in this case, a clip (not shown) located underneath the housing 24 can retain the vial 12 in position and the cover 52 can be dispensed with.

I claim:

1. A trueing device for use in the hanging of wallpaper, which trueing device comprises relatively movable first and second jaws having means biasing said jaws to a closed position for gripping a longitudinal edge of the wallpaper, first and second hand grips respectively positioned one on each of the first and the second jaws, a single spirit level vial for enabling the trueing device to give a true vertical line, and abuting means against which the longitudinal edge of the wallpaper abuts in order to ensure that the trueing device is correctly positioned along the longitudinal edge of the wallpaper, the trueing device being such that it is operable with one hand for ease of insertion and removal of the trueing device on the wallpaper during hanging of the wallpaper, and the spirit level vial being a straight spirit level vial positioned to enable the spirit level vial to be read when the trueing device is gripping either longitudinal edge of the wallpaper.

2. A trueing device according to claim 1 and which is formed in two separate parts with the first jaw belonging to one part and the second jaw belonging to the other part.

3. A trueing device according to claim 2 in which the first and the second jaws are biased to the closed position by spring means.

4. A trueing device according to claim 3 in which the spring means comprises a pair of clips which fit over a rear edge of the first and the second jaws.

5. A trueing device according to claim 3 in which the first hand grip is formed as an integral extension of the first jaw, and in which the second hand grip is formed as an integral extension of the second jaw.

6. A trueing device according to claim 5 in which the abuting means is at least one elongate wall portion, and in which the abuting means forms a fulcrum about which the first and the second jaws pivot.

7. A trueing device according to claim 5 and which is so constructed that in use the centre of gravity of the trueing device does not extend beyond the longitudinal edge of the wallpaper, and in which the first and the second jaws have cut away edges forming lead-in portions for receiving the longitudinal edge of the wallpaper.

8. A trueing device according to claim 3 and including gripping means for gripping the wallpaper, the gripper means being provided on an inner surface of at least one of the first and the second jaws.

9. A trueing device according to claim 3 and including visual checking means for enabling a user of the trueing device visually to check that the longitudinal edge of the wallpaper is correctly abuting the abuting means, the visual checking means comprising a pair of spaced apart apertures in the first jaw and a pair of spaced apart apertures in the second jaw, and the apertures in the first and in the second jaws being aligned with each other to enable the longitudinal edge of the wallpaper adjacent the abuting means to be seen.

10. A trueing device according to claim 1 wherein only one spirit level vial is mounted on said jaws.

11. A trueing device according to claim 1 wherein housing means is provided on an outside surface of one of said jaws for mounting said spirit level vial, said housing means comprising a recess receiving said spirit level vial and exposing said spirit level vial for viewing from either direction generally parallel to said abutting means.

* * * * *